J. E. PECK.
HOSE MENDING DEVICE.
APPLICATION FILED APR. 26, 1912.
1,072,253.                                   Patented Sept. 2, 1913.
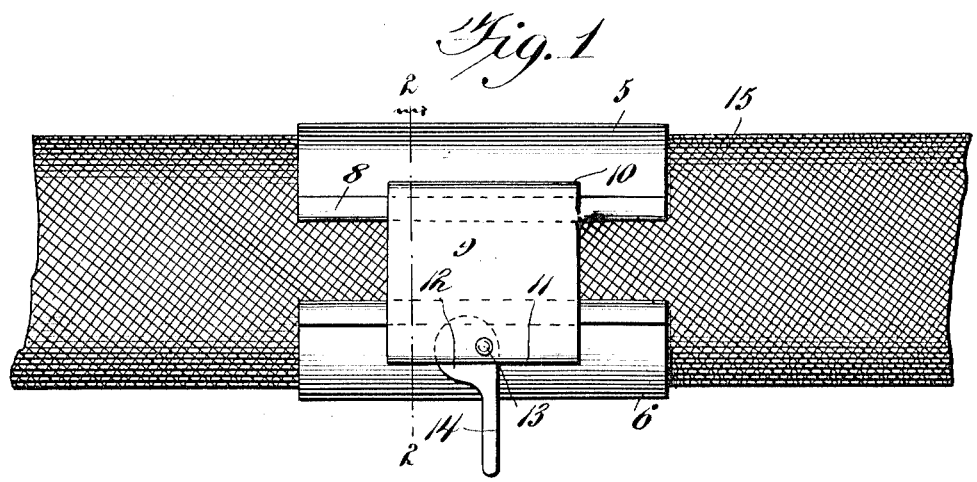
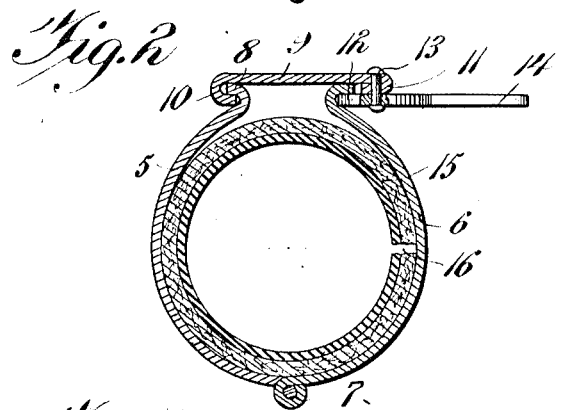
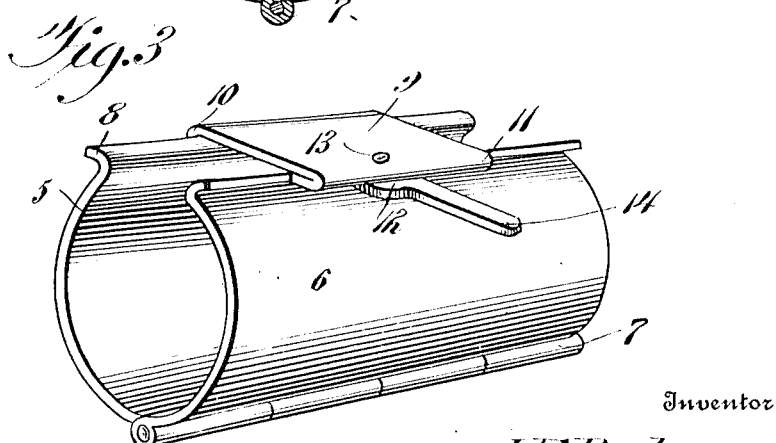
Witnesses
Inventor
J. E. Peck
By Victor J. Evans
Attorney

UNITED STATES PATENT OFFICE.

JOHN E. PECK, OF LOGAN, WEST VIRGINIA

HOSE-MENDING DEVICE.

1,072,253.

Specification of Letters Patent.

Patented Sept. 2, 1913.

Application filed April 26, 1912. Serial No. 693,290.

*To all whom it may concern:*

Be it known that I, JOHN E. PECK, a citizen of the United States, residing at Logan, in the county of Logan and State of West Virginia, have invented new and useful Improvements in Hose-Mending Devices, of which the following is a specification.

The invention relates to hose patches and more particularly to the class of combined hose clamps and mending devices.

The primary object of the invention is the provision of a device of this character in which a hose or pipe may be clamped at the point of fracture or break therein, so as to avoid leakage and at the same time to reinforce the hose at the point of break therein.

Another object of the invention is the provision of a device of this character in which a hose or pipe may be mended should the same become punctured or broken at any particular point thereof, the device being adjustable to accommodate different sizes of hose or pipe and which may be readily and easily applied without damaging or otherwise injuring the hose or pipe thereby rendering it fit for service.

A further object of the invention is the provision of a device of this character which is simple in construction, capable of being readily and easily applied to a pipe or hose so as to stop a leak or leaks therein, and which is inexpensive in manufacture.

With these and other objects in view, the invention consists in the construction, combination and arrangement of parts as will be hereinafter more fully described, illustrated in the accompanying drawing, and pointed out in the claim hereunto appended.

In the drawing:—Figure 1 is a fragmentary plan view of a hose showing the device constructed in accordance with the invention applied thereto. Fig. 2 is a sectional view on the line 2—2 of Fig. 1, looking in the direction of the arrow. Fig. 3 is a perspective view of the device removed from the hose.

Similar reference characters indicate corresponding parts throughout the several views in the drawing.

Referring to the drawing by numerals, 15 designates a portion of a hose which is of any ordinary well-known type, and is merely shown to illustrate a single instance of the manner of application and the use of the hose or pipe clamping or mending device presently described.

The device comprises a two-part sleeve like body, the parts 5 and 6 respectively thereof being connected together by means of a hinge 7 at adjacent edges while the opposite edges are formed with upwardly and outwardly curled clinching flanges 8 to be engaged by means of a clamp presently described.

The clamp comprises a flat plate 9 formed with a downwardly and inwardly bent curled gripping flange 10 which is adapted to engage one of the flanges 8 on either of the parts 5 or 6 of the sleeve-like body, while connected to the said plate 9 at the folded edge 11 thereof is an eccentric 12 which is adapted to engage in the other flange 8 of the said sleeve-like body, the eccentric being connected to the folded edge 11 of the plate 9 by means of a pivot 13, and is formed with a lever 14 whereby the eccentric 12 may be swung into locking engagement to securely fasten the clamp on the sleeve-like body when placed about and surrounding a hose 15 which has burst or become injured as indicated at 16, the sleeve-like body closing the said hole or opening 16, so as to stop the leaking of the hose 15 while in use.

In applying the device the sleeve-like body including the parts 5 and 6 are placed about the hose 15 and are moved over the break or puncture therein whereupon the clamp is engaged with the flanges 8 of the parts 5 and 6 and on swinging the eccentric 12 in one direction the parts 5 and 6 will be securely fastened about the hose, thus stopping the leak therein.

From the foregoing description, taken in connection with the accompanying drawing, it is thought that the construction and operation of the invention will be clearly understood, and therefore, a more extended explanation has been omitted.

What is claimed is:—

A hose patch comprising a sleeve formed from two sections and hingedly connected together, both of said sections being formed with out-turned flanges at their free longitudinal edges, a locking plate having downwardly and inwardly bent flanges arranged opposite each other, the major portion of one flange being spaced from the face adjacent thereto of the plate, while the major portion of the other flange contacts with the said face adjacent thereto of the plate, the first-named flange being designed to interlock with one of the flanges of one section, while the edge of the other flange is designed to work in the path of the edge of the other flange on the other section to serve as a stop for the said flange, the under face of the plate being designed to serve as a guide for the flange acting against the stop when applying the sleeve to a hose, and a cam pivotally connected to the last named flange and adapted for interlocking engagement with the flange on the section adjacent thereto of the sleeve.

In testimony whereof I affix my signature in presence of two witnesses.

JOHN E. PECK.

Witnesses:
L. G. BURNS,
S. E. McDONALD.